Aug. 7, 1928.
G. V. KENTON
1,679,474
NUT LOCK
Filed Aug. 24, 1927
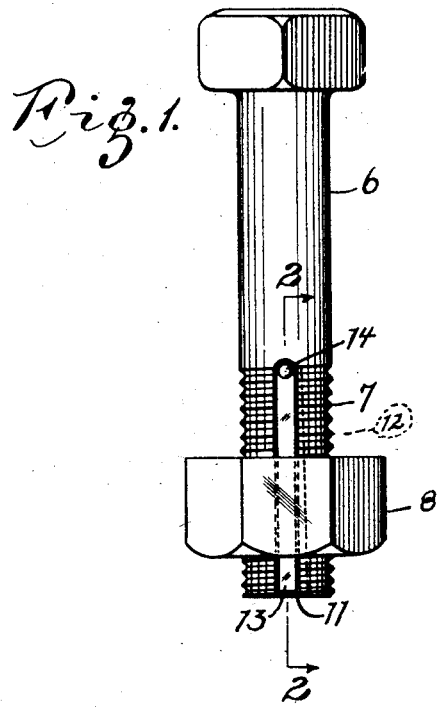
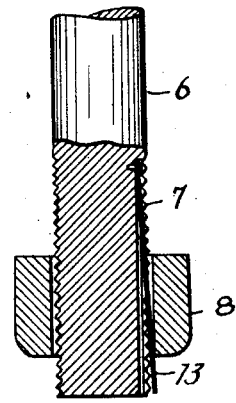
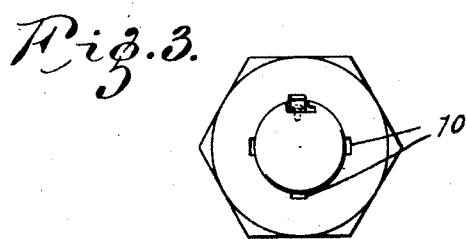
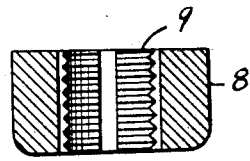
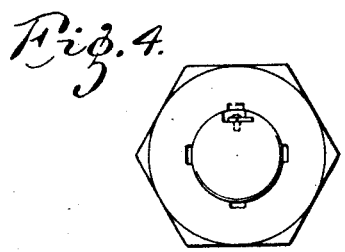
INVENTOR:
GUSSIE V. KENTON.
BY Arthur C Eckert
ATTORNEY.

Patented Aug. 7, 1928.

1,679,474

UNITED STATES PATENT OFFICE.

GUSSIE V. KENTON, OF OVERLAND, MISSOURI.

NUT LOCK.

Application filed August 24, 1927. Serial No. 215,112.

The object of my device is to make a nut lock which will securely lock a nut in position on a bolt at any desired location on the bolt. A further object is to make a nut lock which is positive in its action and that cannot be broken in ordinary usage and one which may be easily moved from its unlocked to its locked position manually. A further object is to devise a nut lock in which the conventional bolt and nut is used with only a slight modification. A still further object is to make a nut lock that is made of few and simple parts that lend themselves readily to multiple production and that can easily be built in a bolt and nut.

With these and other objects in view my invention has relation to certain novel features of construction and arrangement of parts as will be hereinafter more fully described, pointed out in the claims and illustrated in the drawing in which, Fig. 1 is a front elevation of a bolt and nut with my locking device attached.

Fig. 2 is a longitudinal sectional elevation on the line 2—2 of Fig. 1.

Fig. 3 is a plan view of a bolt and nut with my locking device attached, showing the locking device in its unlocked position.

Fig. 4 is a similar view to Fig. 3 showing my locking device in its locked position and Fig. 5 is a sectional elevation of the nut used in my device. Numeral 6 designates a conventional bolt having the conventional threads 7 formed thereon. Numeral 8 is a conventional nut having the conventional threads 9 formed therein. Numerals 10 designate longitudinal slots cut in the threads of the nut 8 and spaced apart 90°. Numeral 11 designates a single longitudinal slot cut in the threaded portion of the bolt 6. At one side (the right side shown in Fig. 1) a longitudinal slot 12 is formed under the threads 7 and connecting with the single longitudinal slot 11 and of the same length as said slot. Numeral 13 designates a leaf spring pivotally secured in the single longitudinal slot 11 by means of the pivot 14. The thickness of the leaf spring 13 is such that when it is in its depressed position it is below and out of the path of the threads 7. The leaf spring 13 is so formed that by virtue of its resilience it normally has its outer portion extending upward and above the threads 7. In order to place the nut 8 in threaded engagement with the threads 7 of the bolt 6 it is only necessary to manually depress the leaf spring 13 into the longitudinal slot 11. When the pressure of the leaf spring 13 is removed, it will be forced into one of the slots 10 and thereby prevent further rotation in either direction of the nut 8. It will be seen that since the slots 10 are positioned a quarter of a turn apart that the locking will take place within the movement of a quarter turn of the nut 8. If it is desired to have the locking take place at a lesser movement of the nut 8, more slots such as 10 may be provided. These slots would be preferably positioned equidistant.

In order to disengage the nut 8 from its locked position, it is only necessary to again depress the leaf spring 13. In order to facilitate the positioning of the nut 8 on the threads 7 of the bolt 6 and in order to obviate the manually depressing of the leaf spring 13 during this operation, the longitudinal slot 12 is provided and the leaf spring 13 is pivoted at 14 as previously indicated. In order to position the leaf spring 13 out of engagement with one of the slots 10, it is only necessary to depress the leaf spring 13 and slightly rotate it about the pivot 14 to the right in Fig. 1 so that the leaf spring 13 will become engaged in the longitudinal slot 12 below the threads 7. In this position the nut 8 may be moved in threaded engagement in either direction just as is done when my locking device is not applied. In order to lock the nut after the leaf spring 13 has been placed in the position just indicated, it is only necessary to slightly depress the spring and move it to the left in Fig. 1.

What I claim and mean to secure by Letters Patent is:

1. In combination with a bolt having a longitudinal slot formed therein, and a longitudinal recess in communication with said slot and beneath the threads of said bolt, a leaf spring pivotally secured in said slot so as to be capable of being rotated into the recess in communication with said slot, a nut having a longitudinal slot formed therein.

2. In combination with a bolt having a longitudinal slot formed therein, and a longitudinal recess in communication with said slot and beneath the threads of said bolt, a leaf spring pivotally secured in said slot so as to be capable of being rotated into the recess in communication with said slot, a nut having a plurality of longitudinal slots formed therein.

In testimony whereof I affix my signature.

GUSSIE V. KENTON.